United States Patent
Shimamoto et al.

(10) Patent No.: US 11,127,533 B2
(45) Date of Patent: Sep. 21, 2021

(54) SOLID ELECTROLYTIC CAPACITOR AND METHOD FOR MANUFACTURING SAME

(71) Applicant: Panasonic Intellectual Property Management Co., Ltd., Osaka (JP)

(72) Inventors: Yukari Shimamoto, Kyoto (JP); Hiroshi Yoshida, Kyoto (JP); Kyohei Kobayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/102,682

(22) Filed: Aug. 13, 2018

(65) Prior Publication Data

US 2019/0006109 A1    Jan. 3, 2019

Related U.S. Application Data

(63) Continuation of application No. PCT/JP2017/001889, filed on Jan. 20, 2017.

(30) Foreign Application Priority Data

Mar. 10, 2016    (JP) .............................. JP2016-046598

(51) Int. Cl.
*H01G 9/00*    (2006.01)
*H01G 9/055*    (2006.01)
(Continued)

(52) U.S. Cl.
CPC ......... *H01G 9/0003* (2013.01); *H01G 9/0032* (2013.01); *H01G 9/0036* (2013.01);
(Continued)

(58) Field of Classification Search
CPC .... H01G 9/0003; H01G 9/025; H01G 9/0155; H01G 9/04; H01G 9/048; H01G 9/15;
(Continued)

(56) References Cited

U.S. PATENT DOCUMENTS

2005/0162814 A1    7/2005    Maruko et al.
2006/0046417 A1    3/2006    Kobayashi et al.
(Continued)

FOREIGN PATENT DOCUMENTS

CN    1679125 A    10/2005
CN    102122583 A    7/2011
(Continued)

OTHER PUBLICATIONS

International Search Report of PCT application No. PCT/JP2017/001889 dated Apr. 4, 2017.
(Continued)

*Primary Examiner* — Arun Ramaswamy
(74) *Attorney, Agent, or Firm* — McDermott Will & Emery LLP

(57) ABSTRACT

A solid electrolytic capacitor includes a capacitor element. The capacitor element includes an anode foil, a dielectric layer, a solid electrolyte layer, and a cathode lead-out layer. The anode foil includes a first part and a second part other than the first part. The first part has an etched surface, and a second part has an unetched surface. The dielectric layer is formed on the etched surface of the first part in the anode foil. The solid electrolyte layer is formed on at least a part of a surface of the dielectric layer. The cathode lead-out layer is formed on at least a part of a surface of the solid electrolyte layer. An insulating protective layer covers a boundary part between the first part and the second part as well as an end of the cathode lead-out layer and an end of the solid electrolyte layer.

10 Claims, 3 Drawing Sheets

(51) Int. Cl.
  *H01G 9/04* (2006.01)
  *H01G 9/08* (2006.01)
  *H01G 9/012* (2006.01)
  *H01G 9/15* (2006.01)
  *H01G 9/025* (2006.01)
  *H01G 9/042* (2006.01)
  *H01G 9/07* (2006.01)

(52) U.S. Cl.
  CPC ............. *H01G 9/012* (2013.01); *H01G 9/025* (2013.01); *H01G 9/04* (2013.01); *H01G 9/055* (2013.01); *H01G 9/08* (2013.01); *H01G 9/0425* (2013.01); *H01G 9/07* (2013.01)

(58) Field of Classification Search
  CPC .... H01G 9/055; H01G 9/0425; H01G 9/0032; H01G 9/0036; H01G 9/07; H01G 9/012; H01G 9/08
  USPC ........ 361/523, 508, 525, 528, 529; 29/25.03
  See application file for complete search history.

(56) References Cited

U.S. PATENT DOCUMENTS

| | | | | |
|---|---|---|---|---|
| 2007/0247781 | A1* | 10/2007 | Baba | H01G 9/14 361/272 |
| 2011/0157776 | A1* | 6/2011 | Ishida | H01G 9/15 361/524 |
| 2012/0018206 | A1* | 1/2012 | Suenaga | H01G 9/15 174/260 |
| 2013/0026048 | A1* | 1/2013 | Bowen | H01G 9/0029 205/660 |

FOREIGN PATENT DOCUMENTS

| | | |
|---|---|---|
| JP | 2004-319795 | 11/2004 |
| JP | 2005-216929 A | 8/2005 |
| JP | 2008-177237 | 7/2008 |
| JP | 2008-198681 | 8/2008 |
| JP | 2009-129936 | 6/2009 |
| JP | 2011-044607 | 3/2011 |
| WO | 2010/131289 | 11/2010 |

OTHER PUBLICATIONS

English Translation of Chinese Search Report dated Jul. 3, 2019 for the related Chinese Patent Application No. 201780014587.3.
English Translation of Chinese Search Report dated May 18, 2020 for the related Chinese Patent Application No. 201780014587.3.

* cited by examiner

SOLID ELECTROLYTIC CAPACITOR AND METHOD FOR MANUFACTURING SAME

RELATED APPLICATIONS

This application is a continuation of the PCT International Application No. PCT/JP2017/001889 filed on Jan. 20, 2017, which claims the benefit of foreign priority of Japanese patent application No. 2016-046598 filed on Mar. 10, 2016, the contents all of which are incorporated herein by reference.

BACKGROUND

1. Technical Field

The present disclosure relates to a solid electrolytic capacitor including an anode foil that has a partially etched surface, and a method for manufacturing the solid electrolytic capacitor.

2. Description of the Related Art

In a solid electrolytic capacitor, a metal foil containing a valve metal is used as an anode foil of a capacitor element. Etching is provided to all or a part of a surface of the metal foil to increase capacitance of the capacitor element. For example, Unexamined Japanese Patent Publication No. 2004-319795 discloses that a resin coating film is formed as a masking member on a part of a main surface of a metal foil, and etching is performed on a part of the surface of the metal foil in which no coating film is formed.

SUMMARY

A solid electrolytic capacitor according to a first aspect of the present disclosure includes a capacitor element. The capacitor element includes an anode foil, a dielectric layer, a solid electrolyte layer, and a cathode lead-out layer. The anode foil includes a first part and a second part other than the first part. The first part has an etched surface, and a second part has an unetched surface. The dielectric layer is formed on the etched surface of the first part in the anode foil. The solid electrolyte layer is formed on at least a part of a surface of the dielectric layer. The cathode lead-out layer is formed on at least a part of a surface of the solid electrolyte layer. An insulating protective layer covers a boundary part between the first part and the second part as well as an end of the cathode lead-out layer and an end of the solid electrolyte layer.

A method for manufacturing a solid electrolytic capacitor according to a second aspect of the present disclosure includes first to fifth steps below. In the first step, an anode foil including a first part and a second part other than the first part, the first part having an etched surface, the second part having an unetched surface is prepared. In the second step, a dielectric layer is formed on the etched surface of the first part in the anode foil. In the third step, a solid electrolyte layer is formed on at least a part of a surface of the dielectric layer. In the fourth step, a cathode lead-out layer is formed on at least a part of a surface of the solid electrolyte layer to prepare an intermediate body. In the fifth step, the intermediate body is covered with an insulating protective layer on a boundary part between the first part and the second part as well as an end of the cathode lead-out layer and an end of the solid electrolyte layer.

According to the present disclosure, it is possible to provide a highly reliable solid electrolytic capacitor including a capacitor element that has an anode foil having a partially etched surface, and a method for manufacturing the solid electrolytic capacitor.

DETAILED DESCRIPTION OF EMBODIMENT

Figure 5:
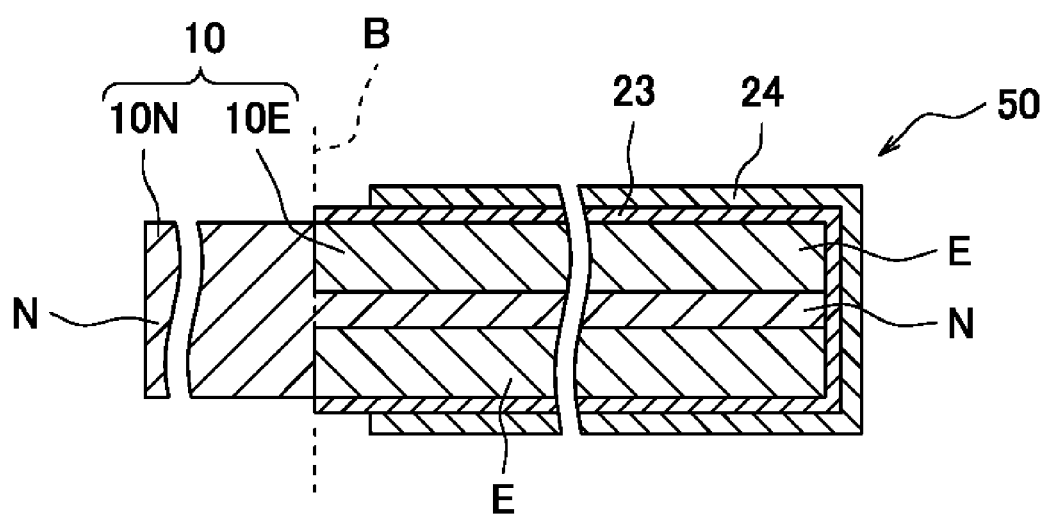
FIG. 5 is a cross-sectional view schematically illustrating a capacitor element included in a conventional solid electrolytic capacitor.

Prior to describing an exemplary embodiment of the present disclosure, problems with a conventional solid electrolytic capacitor are briefly described. FIG. 5 is a cross-sectional view schematically illustrating a capacitor element included in a conventional solid electrolytic capacitor. FIG. 5 illustrates capacitor element 50 including an anode foil that has a partially etched surface. Capacitor element 50 includes anode foil 10 having first part 10E that has an etched surface and second part 10N that has an unetched surface. Second part 10N is a part other than first part 10E. And a dielectric layer (not illustrated), solid electrolyte layer 23, and cathode lead-out layer 24 are sequentially formed on the etched surface of first part 10E. In first part 10E, etching part E, non-etching part N, and etching part E are disposed in this order along thickness of first part 10E.

Thickness of non-etching part N in first part 10E is smaller than thickness of second part 10N, so that a boundary part between second part 10N and non-etching part N in first part 10E, i.e., boundary part B between first part 10E and second part 10N is vulnerable to stress from an exterior. Therefore, in manufacture of the solid electrolytic capacitor with use of capacitor element 50, when stress is applied to a vicinity of boundary part B between first part 10E and second part 10N in anode foil 10, a crack is generated in the vicinity of boundary part B to easily damage anode foil 10. This results in difficulty giving a capacitor having stable quality.

Thus, the present disclosure provides a highly reliable solid electrolytic capacitor including a capacitor element that has an anode foil having a partially etched surface, and a method for manufacturing the solid electrolytic capacitor.

Hereinafter, a solid electrolytic capacitor according to the present disclosure is described with reference to FIG. 1. The present disclosure, however, is not limited to this example.

The solid electrolytic capacitor according to the present disclosure includes a capacitor element having an anode foil that has a partially etched surface. That is, as illustrated in FIG. 1, capacitor element 20 included in the solid electrolytic capacitor according to the present disclosure includes anode foil 10 having first part 10E that has an etched surface and second part 10N that has an unetched surface. Second part 10N is a part other than first part 10E. A dielectric layer (not illustrated) is formed on the etched surface of first part 10E in anode foil 10. Solid electrolyte layer 23 is formed on at least a part of a surface of the dielectric layer. And cathode lead-out layer 24 is formed on a part of a surface of solid electrolyte layer 23. In first part 10E, etching part E, non-etching part N, and etching part E are disposed in this order along thickness of first part 10E.

Since second part 10N is not etched, second part 10N has a merit of retaining higher mechanical strength than mechanical strength of first part 10E.

Second part 10N is used for, for example, joining to an anode terminal. When a plurality of capacitor elements are used to constitute the solid electrolytic capacitor, second parts 10N of the plurality of capacitor elements are connected to one another. Since second part 10N has a clean flat and smooth surface and is less likely to be compressed, second part 10N has a merit of easily providing stronger adhesion by, for example, welding to an anode terminal or second part 10N of another capacitor element.

Further, since second part 10N is not etched, second part 10N has a merit of being less likely to allow intrusion of a solid electrolyte component from etching part E in first part 10E into second part 10N.

On the other hand, there is a demerit that a boundary part between second part 10N and non-etching part N in first part 10E, i.e., boundary part B between first part 10E and second part 10N is vulnerable to stress from an exterior because thickness of non-etching part N in first part 10E is smaller than thickness of second part 10N.

In the solid electrolytic capacitor according to the present disclosure, insulating protective layer 25 covers boundary part B between first part 10E and second part 10N in anode foil 10 and a vicinity of boundary part B as well as an end of cathode lead-out layer 24 and an end of solid electrolyte layer 23, so as to solve the demerit. Here, insulating protective layer 25 also covers an end (protrusion) of solid electrolyte layer 23 that is exposed from cathode lead-out layer 24.

By covering boundary part B and the vicinity of boundary part B with insulating protective layer 25, it is possible to sufficiently protect and reinforce the vicinity of boundary part B. Accordingly, in manufacture of the solid electrolytic capacitor with use of capacitor element 20, it is possible to prevent damage to anode foil 10 that is caused by a crack generated in the vicinity of boundary part B between first part 10E and second part 10N in anode foil 10. This results in giving a capacitor element having stable quality to increase the reliability of the solid electrolytic capacitor.

Cathode lead-out layer 24 is formed by applying predetermined cathode paste (carbon paste or silver paste described later) to the surface of solid electrolyte layer 23 and drying the paste. In order to inhibit an internal short circuit caused by contact of the cathode paste applied to the surface of solid electrolyte layer 23 with anode foil 10 or the dielectric layer, the cathode paste may be applied to a predetermined region on the surface of solid electrolyte layer 23. The predetermined region is separated for a certain distance from the end of the surface of solid electrolyte layer 23 and is at a side of the first part rather than the end of the surface of solid electrolyte layer 23. In this case, cathode lead-out layer 24 is not formed on the entire surface of solid electrolyte layer 23. A part (end) of the surface of solid electrolyte layer 23 is exposed from cathode lead-out layer 24.

By covering with insulating protective layer 25 the end of solid electrolyte layer 23 that is exposed from cathode lead-out layer 24, it is possible to obtain an effect of reinforcing the vicinity of boundary part B as well as an effect of suppressing degradation of the solid electrolyte layer caused by contact with moisture or by oxidation.

Figure 1:
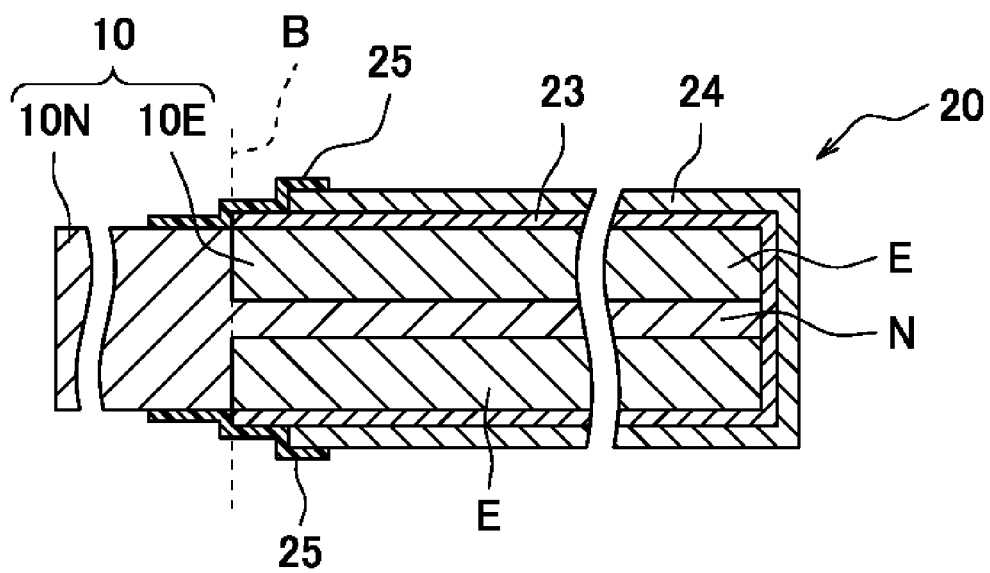
FIG. 1 is a cross-sectional view schematically illustrating one example of a capacitor element included in a solid electrolytic capacitor according to the present disclosure.

In order to certainly cover with the insulating protective layer the entire end of solid electrolyte layer 23 that is exposed from cathode lead-out layer 24, protective layer 25 is required to cover, as illustrated in FIG. 1, the end of solid electrolyte layer 23 as well as the end of cathode lead-out layer 24 and an end of second part 10N that are adjacent to the end of solid electrolyte layer 23.

By covering with protective layer 25 the end of solid electrolyte layer 23 that is exposed from cathode lead-out layer 24 as well as the end of cathode lead-out layer 24 and the end of second part 10N that are adjacent to the end of solid electrolyte layer 23, it is possible to certainly prevent generation of an internal short circuit caused by electrical contact between cathode lead-out layer 24 and second part 10N in anode foil 10 or the dielectric layer.

Figure 2:
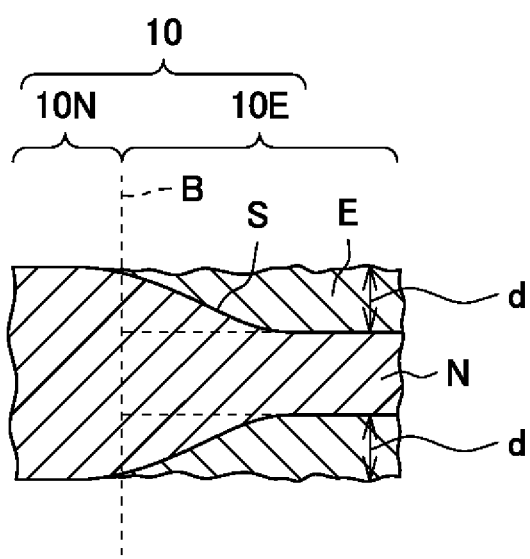
FIG. 2 is a cross-sectional view schematically illustrating a boundary part between a first part and a second part and a vicinity of the boundary part in an anode foil as one example included in the solid electrolytic capacitor according to the present disclosure.

As illustrated in FIG. 2, when first part 10E includes inclination part S in which depth of etching gradually increases from boundary part B between first part 10E and second part 10N, the vicinity of boundary part B covered with protective layer 25 preferably includes inclination part S. By providing inclination part S, it is possible to suppress a decrease in mechanical strength in the vicinity of boundary part B in anode foil 10. By covering with the protective layer boundary part B and the vicinity of boundary part B including inclination part S, it is possible to further reinforce the vicinity of boundary part B.

From a viewpoint of certainly insulating cathode lead-out layer 24 from second part 10N and the dielectric layer, protective layer 25 preferably contains insulating resin.

From a viewpoint of electrical insulating properties, reinforcement of boundary part B in anode foil 10, and suppression of degradation of solid electrolyte layer 23, the insulating resin preferably contains at least one selected from the group consisting of epoxy resin, phenolic resin, silicone resin, melamine resin, urea resin, alkyd resin, polyurethane, a polyamide, a polyimide, a polyamide-imide, unsaturated polyester, and the like.

Protective layer 25 preferably has a thickness ranging from 0.1 μm to 10 μm, inclusive. Protective layer 25 having a thickness of 0.1 μm or more can certainly protect and reinforce a region covered with protective layer 25 that includes boundary part B in anode foil 10. Protective layer 25 having a thickness of 10 μm or less enables, when a plurality of capacitor elements are used to constitute the solid electrolytic capacitor, neat stacking of the capacitor elements to secure high reliability for manufacture of the solid electrolytic capacitor.

The dielectric layer is formed by, for example, anodizing a surface of etching part E in first part 10E by a chemical conversion treatment or the like. Thus, the dielectric layer is constituted by an oxidized coating film of the anode foil. The anodization can be performed by a publicly known method. A method for forming the dielectric layer, however, is not limited to the anodization, and any method is applicable as long as the method is capable of forming on the surface of etching part E an insulating layer that functions as a dielectric body.

Solid electrolyte layer 23 contains, for example, a manganese compound and a conductive polymer. Examples of the conductive polymer include polypyrrole, polythiophene, polyaniline, and derivatives of these polymers.

Cathode lead-out layer 24 is used for connection to a cathode terminal (not illustrated). Cathode lead-out layer 24 includes, for example, a carbon layer formed on a part of the surface of solid electrolyte layer 23, and a metal (e.g., silver) paste layer formed on a surface of the carbon layer (both layers not illustrated).

The carbon layer is made of a composition containing a conductive carbon material such as graphite. The metal paste layer is made of, for example, a composition containing silver particles and resin. Cathode lead-out layer 24, however, is not limited to this configuration. Cathode lead-out layer 24 only needs to have a power collection function.

[Method for Manufacturing Solid Electrolytic Capacitor]

A method for manufacturing a solid electrolytic capacitor according to the present disclosure includes: a first step of preparing an anode foil including a first part and a second part other than the first part, the first part having an etched surface, the second part having an unetched surface; second step of forming a dielectric layer on the etched surface of the first part in the anode foil; a third step of forming a solid electrolyte layer on at least a part of a surface of the dielectric layer; a fourth step of forming a cathode lead-out layer on at least a part of a surface of the solid electrolyte layer to prepare an intermediate body; and a fifth step of covering the intermediate body with an insulating protective layer on a boundary part between the first part and the second part and on a vicinity of the boundary part as well as an end of the cathode lead-out layer and an end of the solid electrolyte layer. The fifth step enables the insulating protective layer to cover a protrusion (end) of the solid electrolyte layer that is exposed from the cathode lead-out layer.

The first step includes, for example, a step of preparing a metal foil, disposing a masking member on a part of a surface of the metal foil, and then performing predetermined etching. The etching may be performed by a publicly known method, for example, electrolytic etching.

The metal foil contains a valve metal. Examples of the valve metal include titanium, tantalum, aluminum, and niobium. These valve metals may be used alone or in combination of two or more. The metal foil may contain the valve metal in a form of an alloy or an intermetallic compound. The metal foil has a thickness ranging from 15 µm to 300 µm, inclusive, for example.

As a method for disposing the masking member (first protective layer 45a described later) on a part of the surface of the metal foil, there is exemplified a method for applying a solution containing insulating resin to the part to be masked of the surface of the metal foil so as to form a coat and then drying the coat, or a method for attaching a masking member having an adhesive layer on a surface of the masking member to the part to be masked of the surface of the metal foil.

The masking member is not particularly limited, and may be an insulator such as resin or may be a conductor containing a conductive material.

When the masking member is an insulator, thermosetting resin or thermoplastic resin may be used. Examples of the thermosetting resin include urethane resin, phenolic resin, epoxy resin, silicone resin, and polyimide. Examples of the thermoplastic resin include acrylic resin and polyester.

When the masking member is a conductor, the conductive material contained in the masking member is not particularly limited, and examples include the above-described valve metals; metals such as silver, copper, iron, nickel, gold, platinum, and palladium; carbon materials such as graphite and carbon black; and a conductive polymer.

FIG. 2 schematically illustrates a part of a cross-section of anode foil 10 having a partially electrolytically etched surface, with a conductor used as the masking member. As illustrated in FIG. 2, in anode foil 10 having a partially electrolytically etched surface, etching part E is formed. The etching part E includes inclination part S that gradually deepens along thickness of the etching part from a start point, i.e., a vicinity of boundary part B between a region (unetched surface of second part 10N) that has been covered with the masking member and a region (etched surface of first part 10E) that has not been covered with the masking member. Anode foil 10 having inclination part S suppresses a decrease in mechanical strength in the vicinity of boundary part B in anode foil 10. When the anode foil includes the inclination part, non-etching part N in first part 10E preferably has a thickness of 2 µm or more from a viewpoint of strength. Depth d of etching part E in first part 10E is not particularly limited.

When inclination part S is present, it is preferred in the fifth step to cover the intermediate body obtained in the fourth step with the insulating protective layer at boundary part B and the vicinity of boundary part B that includes inclination part S. This enables further reinforcement of the anode foil.

The second step includes, for example, a step of anodizing an irregular surface of etching part E in first part 10E by a predetermined anodizing treatment or the like. The anodization by an anodizing treatment or the like may be performed by a publicly known method. A method for forming the dielectric layer, however, is not limited to the anodization, and any method is applicable as long as the method is capable forming in etching region 10E an insulating layer that functions as a dielectric body.

The third step includes, for example, a step of chemically and/or electrolytically polymerizing a raw material monomer on the surface of the dielectric layer. Examples of the raw material monomer include materials that constitute polymers such as polypyrrole, polythiophene, polyaniline, and derivatives of these polymers.

Alternatively, the third step may include, for example, a step of applying to the surface of the dielectric layer a solution obtained by dissolving a conductive polymer or a dispersion liquid obtained by dispersing a conductive polymer, followed by drying. As the conductive polymer, polypyrrole, polythiophene, polyaniline, or derivatives of these polymers, for example, can be used. The solution and the dispersion liquid may also contain a manganese compound.

The fourth step includes, for example, a step of forming a carbon layer on a part of the surface of the solid electrolyte layer and a step of forming a metal paste layer on a surface of the carbon layer. The step of forming the carbon layer includes, for example, a step of applying carbon paste to a part of the surface of the solid electrolyte layer, followed by drying. The step of forming the metal paste layer includes, for example, a step of applying silver paste to the surface of the carbon layer, followed by drying.

The fifth step preferably includes a step of applying a solution containing insulating resin to the intermediate body, specifically the boundary part between the first part and the second part and the vicinity of the boundary part, and additionally covering the end of the cathode lead-out layer and the end of the solid electrolyte layer so as to form a coat, and then drying the coat.

Application of the solution containing insulating resin enables the insulating protective layer to be easily formed. By changing an application amount of the solution containing insulating resin, thickness of the protective layer can be easily adjusted.

It is preferable to apply the solution containing insulating resin also to the end of the cathode lead-out layer and an end of the second part that are adjacent to the end of the solid electrolyte layer so that the insulating protective layer is formed thereon. This enables the insulating protective layer to certainly cover an entire exposed surface of the solid electrolyte layer. Further, this certainly prevents generation of an internal short circuit caused by electrical contact between the cathode lead-out layer and second part 10N or the dielectric layer.

In the first step, when an insulator such as resin is used as the masking member, the masking member may be used as a part of the insulating protective layer without removing the masking member in a following step.

Figure 3:
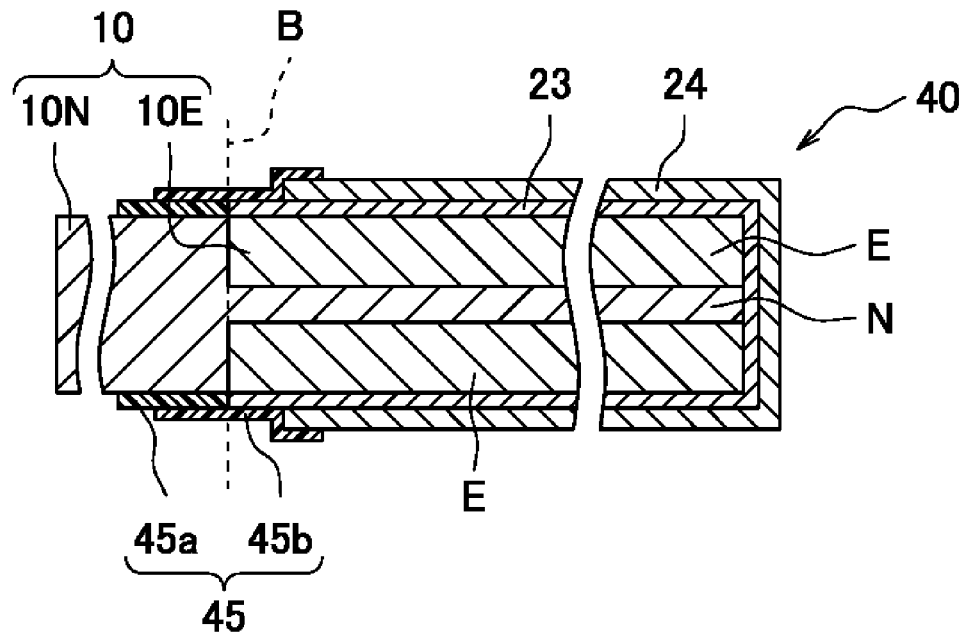
FIG. 3 is a cross-sectional view schematically illustrating another example of the capacitor element included in the solid electrolytic capacitor according to the present disclosure.

FIG. 3 illustrates a case where an insulator used as the masking member serves as a part of the insulating protective layer. FIG. 3 is a cross-sectional view schematically illustrating another example of the capacitor element included in the solid electrolytic capacitor according to the present disclosure. Capacitor element 40 illustrated in FIG. 3 has the same configuration as in capacitor element 20 illustrated in FIG. 1 except that, instead of insulating protective layer 25, first protective layer 45a covering at least a part of second part 10N and second protective layer 45b covering at least a part of first protective layer 45a are disposed.

In this case, insulating protective layer 45 is constituted by first protective layer 45a made of the insulator, which was used as the masking member forms, in cooperation with second protective layer 45b. Insulating protective layer 45 covers boundary part B between a first part and a second part, and a vicinity of boundary part B as well as an end of cathode lead-out layer 24 and an end of solid electrolyte layer 23. For first protective layer 45a and second protective layer 45b, the above-described insulating resin usable for protective layer 25 can be used.

Second protective layer 45b is formed by, for example, applying a solution containing insulating resin to boundary part B between first part 10E and second part 10N and the vicinity of boundary part B, and additionally covering the end of cathode lead-out layer 24 and the end of solid electrolyte layer 23 so as to form a coat, and then drying the coat.

In order to certainly cover with insulating protective layer 45 the entire end of solid electrolyte layer 23 that is exposed from cathode lead-out layer 24, second protective layer 45b covers, as illustrated in FIG. 3, the end of solid electrolyte layer 23 as well as the end of cathode lead-out layer 24 and an end of first protective layer 45a that are adjacent to the end of solid electrolyte layer 23.

[Solid Electrolytic Capacitor]

Figure 4:
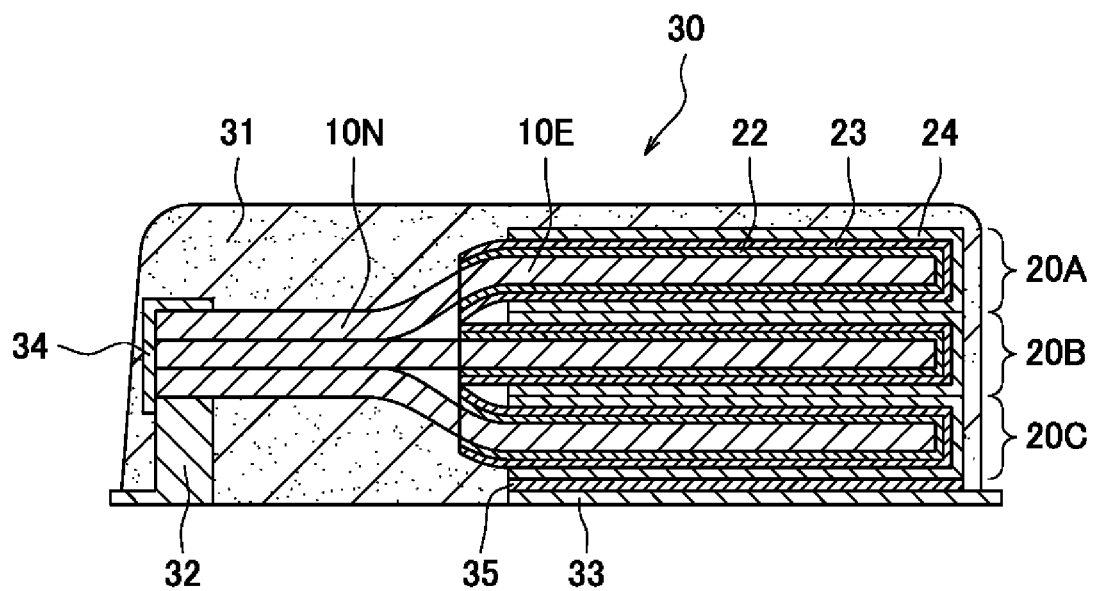
FIG. 4 is a cross-sectional view schematically illustrating a solid electrolytic capacitor according to one exemplary embodiment of the present disclosure.

FIG. 4 is a cross-sectional view schematically illustrating solid electrolytic capacitor 30 including capacitor elements 20 (20A to 20C). In FIG. 4, an insulating protective layer is not illustrated. In FIG. 4, dielectric layer 22 is illustrated that is formed on an etched surface of first part 10E. The plurality of stacked capacitor elements 20A to 20C are connected in parallel to one another.

Hereinafter, a configuration of capacitor 30 according to the present disclosure is described in detail. Although capacitor 30 according to a present exemplary embodiment includes three capacitor elements, a number of included capacitor elements is not limited. Capacitor 30 includes at least one capacitor element.

Capacitor 30 includes capacitor elements 20A to 20C, outer packing 31 that encapsulates the capacitor elements, anode terminal 32 electrically connected to second part 10N in anode foil 10, and cathode terminal 33 electrically connected to cathode lead-out layer 24. Such capacitor 30 is manufactured by joining anode terminal 32 and cathode terminal 33 to predetermined positions of any capacitor element 20 and encapsulating capacitor elements 20A to 20C in outer packing 31.

Capacitor elements 20 are joined by, for example, integrally swaging non-etching regions, or second parts 10N with swage member 34, and electrically connected to one another. A method for joining capacitor elements 20 to one another is not limited to the swaging, and the capacitor elements may be joined by laser welding or resistance welding.

Outer packing 31 is formed of, for example, insulating resin. Examples of the insulating resin include epoxy resin, phenolic resin, silicone resin, melamine resin, urea resin, alkyd resin, polyurethane, a polyimide, a polyamide-imide, and unsaturated polyester.

Anode terminal 32 is joined to second part 10N and electrically connected to anode foil 10. A material for anode terminal 32 is not particularly limited as long as the material is conductive. Anode terminal 32 may be joined to second part 10N with a conductive adhesive agent or solder disposed between the anode terminal and the second part or may be joined to second part 10N by resistance welding or laser welding.

Cathode terminal 33 is electrically connected to cathode lead-out layer 24. A material for cathode terminal 33 is not also particularly limited as long as the material is conductive. Cathode terminal 33 is joined to cathode lead-out layer 24 with, for example, above-described conductive adhesive agent 35 interposed between the cathode terminal and the cathode lead-out layer.

A solid electrolytic capacitor according to the present disclosure includes a capacitor element having excellent quality and thus is applicable to various usages.

What is claimed is:
1. A solid electrolytic capacitor comprising a capacitor element, the capacitor element including:
   an anode foil including a first part and a second part other than the first part, wherein the first part has an etched surface, and the second part is not etched to have an unetched surface;
   a dielectric layer disposed on the etched surface of the first part in the anode foil;
   a solid electrolyte layer disposed on at least a part of a surface of the dielectric layer; and
   a cathode lead-out layer formed on at least a part of a surface of the solid electrolyte layer, wherein:
   a thickness of non-etching part in the first part is smaller than a thickness of the second part,
   an insulating protective layer covers a boundary part between the first part and the second part as well as an end portion of the cathode lead-out layer and an end portion of the solid electrolyte layer,
   the surface of the solid electrolyte layer has a first surface part exposed from the cathode lead-out layer, the first surface part being opposite to the etched surface of the first part of the anode foil, the insulating protective layer is in direct contact with the first surface part and covers an entirety of the first surface part, and the insulating protective layer covers an entirety of the end portion of the cathode lead-out layer, the first part includes an inclination part that is adjacent to the boundary part between the first part and the second part, depth of etching in the inclination part gradually increases as being far from the boundary part, and the insulating protective layer covers the inclination part.

2. The solid electrolytic capacitor according to claim 1, wherein the insulating protective layer has a thickness ranging from 0.1 µm to 10 µm, inclusive.

3. The solid electrolytic capacitor according to claim 1, wherein the insulating protective layer contains insulating resin.

4. The solid electrolytic capacitor according to claim 3, wherein the insulating resin contains at least one selected from the group consisting of epoxy resin, phenolic resin, silicone resin, melamine resin, urea resin, alkyd resin, polyurethane, a polyamide, a polyimide, a polyamide-imide, and unsaturated polyester.

5. A method for manufacturing a solid electrolytic capacitor, the method comprising:

a first step of preparing an anode foil including a first part and a second part other than the first part, wherein the first part has an etched surface, and the second part is not etched to have an unetched surface;

a second step of forming a dielectric layer on the etched surface of the first part in the anode foil;

a third step of forming a solid electrolyte layer on at least a part of a surface of the dielectric layer;

a fourth step of forming a cathode lead-out layer on at least a part of a surface of the solid electrolyte layer to prepare an intermediate body; and a fifth step of covering the intermediate body with an insulating protective layer on a boundary part between the first part and the second part as well as an end portion of the cathode lead-out layer and an end portion of the solid electrolyte layer, wherein:

a thickness of non-etching part in the first part is smaller than a thickness of the second part, the first part includes an inclination part that is adjacent to the boundary part between the first part and the second part, depth of etching in the inclination part gradually increases as being far from the boundary part, the insulating protective layer covers the inclination part, in the fourth step, the cathode lead-out layer is formed so that the surface of the solid electrolyte layer has a first surface part exposed from the cathode lead-out layer, the first surface part being opposite to the etched surface of the first part in the anode foil, in the fifth step, the insulating protective layer is formed to be in direct contact with the first surface part and to cover an entirety of the first surface part, and in the fifth step, the insulating protective layer is formed to cover an entirety of the end portion of the cathode lead-out layer.

6. The method for manufacturing a solid electrolytic capacitor according to claim 5, wherein the fifth step includes a step of applying a solution containing insulating resin to cover the boundary part between the first part and the second part, the end portion of the cathode lead-out layer, and the end portion of the solid electrolyte layer, thus forming a coat, and then drying the coat.

7. The solid electrolytic capacitor according to claim 1, wherein the cathode lead-out layer includes a carbon layer disposed on the part of the surface of the solid electrolyte layer, and a metal paste layer disposed on a surface of the carbon layer, and the insulating protective layer covers a part of an outer surface of the metal paste layer.

8. The solid electrolytic capacitor according to claim 1, wherein the insulating protective layer is in direct contact with the first surface part and the unetched surface of the second part.

9. The method for manufacturing a solid electrolytic capacitor according to claim 5, wherein the cathode lead-out layer includes a carbon layer disposed on the part of the surface of the solid electrolyte layer, and a metal paste layer disposed on a surface of the carbon layer, and in the fifth step, the insulating protective layer is formed to cover a part of outer surface of the meal paste layer.

10. The method for manufacturing a solid electrolytic capacitor according to claim 5, wherein in the fifth step, the insulating protective layer is formed to be in direct contact with the first surface part and the unetched surface of the second part.

* * * * *